United States Patent [19]
Froehlich et al.

[11] 3,928,651
[45] Dec. 23, 1975

[54] METHOD FOR FORMING PROCESSED MEATS

[75] Inventors: Leonhard H. Froehlich; Arthur M. Dowell, Jr., both of Danville, Ill.

[73] Assignee: Tee-Pak, Inc., Chicago, Ill.

[22] Filed: Aug. 12, 1974

[21] Appl. No.: 496,483

[52] U.S. Cl. ............................... 426/641; 426/657
[51] Int. Cl.² ........................................... A23L 1/31
[58] Field of Search ............ 426/92, 138, 140, 149, 426/212, 382, 388, 342, 523, 641, 643, 644, 657; 99/176

[56] References Cited
UNITED STATES PATENTS

| | | | |
|---|---|---|---|
| 2,698,800 | 1/1955 | Rueckert | 426/140 |
| 2,868,650 | 1/1959 | Hammerberg | 426/342 |
| 3,123,481 | 3/1964 | Seiler, Jr. | 426/140 |
| 3,533,817 | 10/1970 | Shank | 426/138 X |

*Primary Examiner*—Hyman Lord
*Attorney, Agent, or Firm*—Paul Shapiro; Joseph E. Kerwin; William A. Dittmann

[57] ABSTRACT

This invention relates to an improvement in a process for cooking a meat product wherein the meat is held with string during the cooking operation and the tied product. The improvement in the invention comprises employing a string made of reconstituted edible collagen. Typically, the collagen has been processed by converting a collagen source to a slurry, extruded to form a shaped article capable of being converted to a string, coagulated, and tanned.

2 Claims, No Drawings

METHOD FOR FORMING PROCESSED MEATS

BACKGROUND OF THE INVENTION

It has long been the practice, particularly in the meat industry, to tie certain cuts of meat into a compact form for preparation for human consumption. Rolled roasts come to mind as being the dominant cut of meat which is tied prior to cooking. However, other meat products such as "city chicken," poultry, fish, and recently synthetic meat substitutes made of plant protein, e.g., soy protein, have been prepared in this manner. Sometimes, pork products, typically hams and rolled pork roasts, are tied or wrapped with a string or quite often with a reticulated web woven from string.

In the past, it has been customary to use natural or synthetic fibers for tying meat products or forming reticulated webs (stockinettes) of such fibers. Generally, the strings were made from a cellulose base fiber such as cotton, jute, wool, and paper. Synthetic materials such as rayon, nylon, dacron, and Mylar polyester also have been used as suitable materials for making strings or reticulated webs from such strings.

Although natural and synthetic fibers previously used for preparing strings and reticulated webs for tying or holding the meat product during cooking performed quite well on a functional basis, they had the disadvantage of not being edible. The homemaker had to remove the string or twine prior to serving. Quite often, not all of the string was removed and remained in the meat product. Of course, anyone biting into the string found the string to be quite objectionable.

SUMMARY OF THE INVENTION

This invention relates to an improvement in a process for preparing meat which is normally subjected to cooking wherein the meat is tied or held with string during cooking and the resultant product. The improvement, constituting the basis of the invention, lies in the discovery that reconstituted edible collagen can be substituted for cellulose or synthetic string or twine in preparing such meat products.

The advantages of using or employing reconstituted edible collagen, e.g., one which has been processed by converting a collagen source into a slurry, extruded into a shaped article capable of being converted to a string, coagulated, tanned, and plasticized include:

A string which is edible and does not need to be removed after the cooking operation and prior to consumption;

a string which has sufficient strength to hold the meat product together during cooking but yet becomes tender and soft during the cooking cycle to form a mass which is highly palatable;

a string which permits penetration of smoke or flavorant, other flavorants which may be added to the meat and, therefore, does not impair the flavor of the meat;

a string which absorbs some of the meat juices and flavor so that on consumption blends in excellently with the meat product; and a string which has desirable aesthetic value.

DESCRIPTION OF THE PREFERRED EMBODIMENTS

The meat products suited for practicing this invention include: beef, pork, chicken, fish, lamb, and other conventional sources of meat. The term "meat" as used in this application also is intended to include synthetic meat substitutes such as those derived from plant protein, e.g., soy, cotton, and peanut protein or mixtures of animal meat and plant protein, and the like. Quite often, these plant proteins are used as extenders, binders, or as complete substitutes for meat.

The string suited for tying the processed meat is made from reconstituted edible collagen. The collagen used in making the string is a reconstituted collagen as opposed to collagen appearing in the natural state, e.g., an untreated collagen source. There is substantial art on processing collagen to make shaped articles, e.g., fibers, casings, and films, by converting a collagen source to a slurry or a doughy mass, extruding the slurry through a die to form a shaped article, e.g., a filament or film, coagulating the newly formed filament or film and tanning the filament or film to provide sufficient strength characteristics to the collagen for use in its desired purpose. Quite often, the product is plasticized to give it softness and flexibility.

Representative of a process currently used for making edible collagen films is the "slurry" process which comprises converting a collagen source, e.g., hide collagen, to a slurry then forming a shaped article by extruding the slurry. In this process, the hide layer is first dehaired and the epidermal layer removed for obtaining the corium split. The corium layer is sliced into pieces having a size of from about ¼ to 4 inches on the side in order to provide for convenient handling. The pieces then are passed through a meat grinder having a screen size of about 3/64 inch wherein the hide collagen is further reduced in size. Water is added to the ground collagen to form a slurry having from about 2 – 8 percent collagen content. This slurry then is treated with about a 2 – 4 percent lactic acid solution in water to effect swelling of the collagen fibrils. After the fibrils have completely swollen, the slurry is further dispersed in a suitable homogenizer, typically a two-stage homogenizer, both stages being operated at about 1500 psi drop. The homogenized, swollen collagen slurry then is filtered through a bar filter and extruded through a die to form a shaped article which can be converted to a string. Typically, the collagen slurry is extruded through a slot to form a thin film. The extruded collagen film or article of swollen collagen fibrils is coagulated in a coagulating bath, typically ammonium sulfate and sodium hydroxide adjusted to a pH of about 7. The coagulating bath causes the extruded film or article to collapse and form a coherent, handable article. The article then is tanned in a suitable tanning bath, e.g., containing aluminum sulfate, sodium citrate, and NaOH. After the article is tanned, the article is washed to remove the salt in the film and then passed through a plasticizing tank containing about 2 – 5 percent glycerin. Sometimes, it is necessary to effect a secondary tanning of the article and this can be accomplished by tanning with a dialdehyde such as glutaraldehyde or glyoxal.

The collagen article used for forming the string-like product or reticulated net for holding the meat product can be any article which can be converted to a string-like shape. Such articles include: filaments (sutures), ribbons, tubular casings, and films. The articles can be in the gel state or dried state prior to conversion to a string. Tubular casings can be slit to form a flat film which then can be converted to a string-like shape or they can be flattened to a ribbon shape. Often, the ribbons, when wider than about ⅛ inch, are twisted to form a string-like product.

In a preferred embodiment of the invention, the article is extruded as a thin, narrow ribbon or as a tubular casing, coagulated, tanned, and plasticized. The casing, either in gel or finished form, can be slit or merely flattened to form a ribbon or film. The string can be made by holding one end of the film and spiralling the film about its longitudinal axis to form a twisted string. Alternatively, the string can be made on a ring twister. For best results, the film thickness is about 1 – 3 mils and its width is from about 0.25 – 1.5 inches. There are about 0.25 – 4 revolutions per inch of cord. More than about 4 turns per inch result in a string which does not have desired flexibility or permeability to meat juices. The string, so manufactured, generally has increased strength over an extruded "suture" or a thin, narrow film. Also, the spiralling of the film about an end or by a ring twister to form a twisted cord or twine permits the formation of a string which actually looks like conventional cellulose-type string used for tying rolled roasts. This is an advantage in consumer appeal.

The manufacture of the twisted string has significant advantages over a filament (suture) because of the thickness is that of the thickness of the film wall. Accordingly, juices and flavorants can uniformly penetrate into the string and impart flavor to it thereby rendering its taste similar to that of the meat. On the other hand, a solid filament often does not fully absorb the juices and flavorants to render it indistinct from the meat. Also, the string made in this fashion has greater elasticity and strength.

Quite often certain types of meat products are held by a reticulated web woven from string. These are commonly referred to as stockinettes. Stockinettes can be made by appropriately weaving the collagen string of this invention as is done with conventional strings to form the stockinette.

The following examples are provided to illustrate preferred embodiments of the invention and are not intended to restrict the scope thereof.

EXAMPLE 1

A commercially avialable tubular sausage casing of reconstituted edible collagen having a diameter of about 24 mm. and a wall thickness of about 1 mil is flattened between rollers. The casting then is in the form of a thin, flat film having a width of about ¾ inch. One end of the film is held stationary while the other end is rotated in a 360° arc causing the casing to twist or spiral about its longitudinal axis to produce a string or cord. Rotation is effected until there are about 0.75 revolutions per linear inch of cord. The diameter of the finished cord is about 0.065 inch. Diameters of collagen string commonly used for the tying of meat products is from about 0.005 to about 0.15 inches.

A five pound rolled beef roast is wrapped with the collagen string produced above in conventional manner. The roast then is cooked at about 325°F to an internal temperature of 160°F. After cooking, the roast is examined and it is noticed that the roast remains held intact by the collagen string. On consumption, the string is tender and can be readily cut with a knife or fork and consumed along with the roast. The objectionable features noted in conventional cords and twines are not present with the collagen string as the string has picked up flavorant, juices, and some coloring from the meat to blend in with and remain indistinct from the meat.

EXAMPLE 2

A five pound pork roast is wrapped with a reconstituted edible collagen string in substantially the same manner as the beef roast of Example 1. The pork roast is cooked in an oven at about 350°F to an internal temperature of 190°F. The roast is removed from the oven and it is noted the roast remains intact. The collagen string is very tender, soft, and gelatin-like and can be consumed with the meat without objectionable overtones. The collagen string, primarily because it has been twisted, has absorbed juices and flavorants from the meat. Because of the quality of the string in terms of its texture and flavor, the string does not have to be removed from the roast prior to consumption.

We claim:

1. A method of treating meat products which consists of forming said meat products into desired shapes, tying said formed meat products with an edible binding string consisting of a twisted tubular casing of tanned reconstituted edible collagen, said casing having a film thickness of about 1–3 mils, a width of from about 0.2.5–1.5 inches, and twisted about 0.25–4 revolutions per inch of string, and cooking said tied meat products until said meat products and string are tender and edible.

2. An edible string adapted for holding a meat product during cooking, said string consisting of a twisted tanned reconstituted edible collagen casing, said casing having a film thickness of about 1–3 mils, a width of from about 0.25–1.5 inches, and twisted about 0.25–4 revolutions per inch of string, said string being capable of absorbing meat juices and flavorants so as to impart a meat flavor thereto and rendering its taste similar to that of the meat.

* * * * *